United States Patent [19]
Preus

[11] 3,855,152

[45] Dec. 17, 1974

[54] PREPARATION OF PERLITE-ASPHALT-FIBER COMPOSITIONS FOR SEPARATING HYDROCARBONS FROM WATER

[76] Inventor: Paul Preus, Toms River, N.J. 08753

[22] Filed: Sept. 28, 1972

[21] Appl. No.: 292,886

Related U.S. Application Data

[62] Division of Ser. No. 83,640, Oct. 24, 1970, abandoned.

[52] U.S. Cl. ............ 252/430, 210/DIG. 21, 210/36, 210/40, 252/425.5, 252/427
[51] Int. Cl. ............................................ B01j 11/32
[58] Field of Search ............ 252/328 P, 425.5, 427, 252/428, 430; 210/36, 40, DIG. 21; 117/158; 106/282

[56] References Cited
UNITED STATES PATENTS

| | | | |
|---|---|---|---|
| 2,464,204 | 3/1949 | Baker | 210/40 |
| 2,634,208 | 4/1953 | Miscall et al. | 117/158 |
| 2,728,733 | 12/1955 | Hashimoto | 252/449 |
| 3,382,170 | 5/1968 | Pape | 210/36 |
| 3,414,511 | 12/1968 | Hitzman | 210/40 |
| 3,567,660 | 3/1971 | Winkler | 210/40 |
| 3,589,844 | 6/1971 | Kraemer | 210/40 |
| 3,696,051 | 10/1972 | McGuire et al. | 252/425.5 |
| 3,701,672 | 10/1972 | Ruff et al. | 117/158 |

FOREIGN PATENTS OR APPLICATIONS

| | | | |
|---|---|---|---|
| 979,978 | 1/1965 | Great Britain | 210/DIG. 21 |

Primary Examiner—Daniel E. Wyman
Assistant Examiner—P. E. Konopka
Attorney, Agent, or Firm—Harold L. Stowell

[57] ABSTRACT

A compound for separating organic liquids, particularly hydrocarbons from an organic liquid-water system including a loose mass of expanded perlite mixed with clays and a fiberous filler formed by demoisturizing an aqueous suspension of the compound and communiting the demoisturized mixture.

The compound is introduced into, or contacted by, the organic liquid-water system to selectively absorb the hydrocarbon whereupon the compound and the hydrocarbon absorbed therein are mechanically separated from the system.

2 Claims, No Drawings

PREPARATION OF PERLITE-ASPHALT-FIBER COMPOSITIONS FOR SEPARATING HYDROCARBONS FROM WATER

This is a division of application Ser. No. 83,640, filed Oct. 24, 1970, now abandoned.

BACKGROUND OF THE INVENTION

This invention relates generally to the separation of organic liquids from water and more particularly to a compound for removal of hydrocarbons and other organic contaminants from streams and bodies of water of from aqueous solutions.

As is generally known, organic liquids such as hydrocarbons are immisciable with water and, due to the lower density of the former, float on and can be carried indefinitely by streams and bodies of water. Although this invention has been found suitable for use with organic liquids of many kinds, such as polymers and the like, its use will be specifically described hereinafter in conjunction with hydrocarbons.

With the increased demand for hydrocarbon products, activities involving production, storage and handling of hydrocarbons on or in proximity to bodies of water such as transportation by pipeline and seagoing vessels and offshore oil well-drilling have increased thereby increasing the liklihood of accidental spilling of quantites of hydrocarbons on appurtenant water areas. Such spills have heretofore proven to be extremely difficult to control and have resulted in widespread damage to property and to the ecology. Gradual hydrocarbon contamination of bodies of water can occur from discharge of oily wastes from industrial operations or from ships.

Due to the increased importance now being placed on the preservation of the environment, even minor spills or contamination attract widespread attention and the resultant publicity involves damage to corporate public relations which often far outweighs actual damages to property or to the ecology.

In each of the above cases, it is important that the hydrocarbon, when spilled, be controlled or eliminated or, when discharged in waste, be removed prior to introduction of discharges into streams or bodies or water. Hydrocarbon-water combinations originating from oil slicks formed by spills on bodies of water or from oil-water emulsions caused by oily discharges are referred to hereinafter as hydrocarbon-water systems.

SUMMARY OF THE INVENTION

This invention provides means for controlling and eliminating hydrocarbons and other organic materials from water by furnishing a process for selectively absorbing and stabilizing the material for subsequent mechanical separation thereof.

The invention also provides a loose fiberous material which is olephilic, hydrophobic and floatable on water for selective absorption and stabilization of hydrocarbons in a hydrocarbon-water system and which is of a particle size suitable for mechanical separation from the system.

The invention further provides a process of producing such a material by compounding an expanded perlite with asphalt and a fiberous filler and comminuting the compound to provide a mass of an average particle size such that the mass can be filtered out of a liquid system by mechanical means pervious to flow of liquid therethrough.

In a preferred embodiment, the invention provides a material for separating hydrocarbons from a hydrocarbon-water system comprising a loose mass consisting of expanded perlite, clays and a fiberous filler formed by demoisturizing an aqueous suspension of the compound and subsequently comminuting the demoisturized mixture.

The material is introduced into the system for selectively absorbing the hydrocarbon whereupon the compound and hydrocarbon absorbed therein are separated from the system.

These and other objects and advantages of this invention will become better understood to those skilled in the art by reference to the following detailed description.

DESCRIPTION OF THE PREFERRED EMBODIMENT

The material of this invention generally comprises a compound of a major portion of expanded perlite, asaphalt and a fiberous filler. The constituents are known in the art and have been heretofore used in building boards as described in greater particularity in U.S. Pat. No. 2,634,208 to Miscall et al.

As described in the above patent, the compound is formed into a board-like configuration or sheet whereupon it is demoisturized, preferably by heating in an oven. In accordance with the present invention, the material may be configured in any manner suitable for drying and any other known method of demoisturizing such as compression, centrifuge, vacuum or the like may be used in conjunction with or in place of the heating step specifically described in the patent.

The resultant configuration is then comminuted, preferably in a hammer mill, to produce a loose mass having an average particle size with one dimension thereof of at least 1/8 inch.

In addition to the constituents set forth in the above patent, in a preferred composition the compound will consist of the following constituents by weight:

| | |
|---|---|
| Expanded Perlite | 70% |
| Cellulose Fibers | 23% |
| Clays | 6% |
| Asphalt | 1% |

The clays are preferably 50 percent by weight a clay which occurs naturally in Lowndes County, Alabama and 50 percent a clay which occurs naturally in Big Horn County, Wyoming.

The average particle size can be controlled by selection of screen size for the hammer mill as is known in the art. Comminution can, of course, be accomplished by other means such as by rotary choppers, grinders or the like so long as the minimum particle size is maintained. For purposes of handling, dispersal and maximum absorbent surface, the average maximum size of the particles should be on the order of ¼ inch. The above material, when dispersed, is of sufficient size to be retained or recovered by mechanical means such as screens. The resultant comminuted compound ideally has a density of about 4.5 pounds per cubic foot and is of a consistency which provides ready dispersal thereof either through gravity flow or through fluidization and/or entrainment in air streams from blowers or the like. The consistency of the compound is determined and controlled primarily by the average fiber size of the fiberous filler which, in turn, is determined by the comminuting process as described above.

The organic material absorbing characteristic of the compound is determined by the expanded perlite which exhibits an affinity for hydrocarbon and the asphalt constituent is believed to render the compound water repellant. The resultant material is capable of absorbing between 9 and 15 gallons of petroleum product per pound depending on product viscosity and water temperature. Due to the overall density of the material and the hydrophobic characteristic of the asphalt constituent, the material is non-wettable by water and will float indefinitely on the surface of bodies of water.

Generally, the compound is stored and shipped in loose form in bulk or in bags of suitable capacity. With the provision of bags of suitable wet tear strength and due to the stability and hydrophic character of the compound, the material may be stored in the open where necessary. Where, due to the high bulk factor of the compound, shipping or storage factors become important, the compound may be processed to a demoisturized solid state and shipped or stored for comminution in situ or at selected distribution points to reduce the shipping and/or storage costs.

Dispersal of the compound may be by hand or gravity from aircraft, boats or adjacent structures or may be accomplished through blowers entraining the compound in an airstream to be directed over the surface. Due to the density and the hydrophobic character of the compound as described above, the material carrying the absorbed oil remains floating for subsequent harvesting. The buoyancy of the material is such that, even where low sulphur oils which are nearly neutral in buoyancy and which often sink after evaporation of the lighter ends thereof are absorbed, the oil-material mixture remains buoyant and floats indefinitely. Even if harvesting is delayed for substantial periods of time, the oil-compound mixture will continue to float and thereby not foul the floor of the body of water or otherwise become unharvestable.

Because of the particle size of the material, the oil-material mixture is mechanically manageable, and may therefore be marshalled by use of fixed or moveable baffles such that the oil-material mixture may be directed to a harvesting area or contained until harvesting can be accomplished. Such baffles may be in the nature of booms, pontoons, plates or by high pressure streams of water from hoses or, where water currents, tides or wave action are a factor, stake fences, nets or floating booms with nets suspended therefrom. (Nets of $\theta \times \frac{1}{4}$ inch mesh or $\frac{1}{4}$ inch hardware cloth have been found ideal for these purposes.) Harvesting may be accomplished by shovels, nets conveyers or suction devices such as leaf vacuum machines or the like.

Since the material is relatively inert, non-flammable and non-toxic the addition of the material to the affected environment does not further increase the danger of damage to the ecology and due to the long floating character thereof, retention of the spilled oil for subsequent removal is insured.

The material also exhibits a very tenacious holding capability for the oil absorbed and will not readily give up or release oil once it is absorbed.

Where the problem of hydrocarbon separation involves removal of oil from an oil water discharge, the material may be placed in a container permeable to the fluid flow but having screens or other mechanical means therein to retain the material. Such a container may have provision for independent replacement of portions of the material therein such that portions may be replaced as they become oil saturated thereby providing for continuous operation of the device.

What has been set forth above is intended as exemplary to aid those skilled in the art in the practice of the invention.

What is new and therefore desired to be protected by Letters Patent of the United States is:

1. The process of producing an oleophilic-hydrophobic-lighter than water composition for the separation of water immiscible organic liquid from water produced by:
    forming an aqueous mix of a major proportion of expanded perlite, asphalt, and fibrous material to produce a coherent member;
    removing the moisture from said member;
    comminuting the demoisturized member to produce a loose mass of particles having an average particle size with one dimension of at least about 1/8 inch in length, whereby said mass, when introduced into an organic liquid-water system, selectively absorbs the organic liquid from the water and remains buoyant.

2. The method in accordance with claim 1 wherein a clay constituent is additionally included in the said forming of said aqueous mix.

* * * * *